(12) United States Patent
Kim

(10) Patent No.: US 8,290,535 B2
(45) Date of Patent: Oct. 16, 2012

(54) APPARATUS AND METHOD FOR GENERATING PILOT BEACON OF BASE STATION IN MOBILE COMMUNICATION SYSTEM

(75) Inventor: Tae-Young Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 829 days.

(21) Appl. No.: 12/405,766

(22) Filed: Mar. 17, 2009

(65) Prior Publication Data

US 2009/0233605 A1 Sep. 17, 2009

(30) Foreign Application Priority Data

Mar. 17, 2008 (KR) ........................ 10-2008-0024196

(51) Int. Cl.
*H04M 1/00* (2006.01)
(52) U.S. Cl. .................................. 455/552.1; 455/553.1
(58) Field of Classification Search ............... 455/552.1, 455/553.1, 84, 444
See application file for complete search history.

(56) References Cited

U.S. PATENT DOCUMENTS

| 7,212,821 | B2* | 5/2007 | Laroia et al. ................... 455/437 |
| 7,636,583 | B2* | 12/2009 | Ode et al. ....................... 455/522 |
| 2005/0014474 | A1* | 1/2005 | Jitsukawa et al. ............. 455/101 |
| 2007/0254693 | A1* | 11/2007 | Furukawa ................... 455/553.1 |
| 2009/0022239 | A1* | 1/2009 | Kimura et al. ................ 375/267 |
| 2009/0262851 | A1* | 10/2009 | Hoshino et al. ............... 375/267 |
| 2010/0041433 | A1* | 2/2010 | Stadelmeier et al. ....... 455/552.1 |

FOREIGN PATENT DOCUMENTS

KR 100570827 4/2006

* cited by examiner

*Primary Examiner* — Dean O Takaoka
*Assistant Examiner* — Alan Wong
(74) *Attorney, Agent, or Firm* — The Farrell Law Firm, P.C.

(57) ABSTRACT

An apparatus for generating a pilot beacon of a Base Station (BS) supporting a first communication system and a second communication system is provided. The apparatus includes a first system unit for converting a first signal for the first communication system into a first high-frequency signal, a second system unit for converting a second signal for the second communication system into a second high-frequency signal, and a beacon system unit for alternately generating beacon signals for the first and second communication systems by using the first and second signals.

12 Claims, 9 Drawing Sheets

US 8,290,535 B2

APPARATUS AND METHOD FOR GENERATING PILOT BEACON OF BASE STATION IN MOBILE COMMUNICATION SYSTEM

PRIORITY

This application claims priority under 35 U.S.C. §119(a) to a Korean Patent Application filed in the Korean Intellectual Property Office on Mar. 17, 2008 and assigned Serial No. 10-2008-0024196, the contents of which are incorporated herein by reference.

BACKGROUND OF THE INVENTION

1. Field of the Invention

The present invention relates to an apparatus for generating a pilot beacon of a Base Station (BS) in a mobile communication system. More particularly, the present invention relates to an apparatus for generating a pilot beacon, to be used for performing handover of a Mobile Station (MS), in a BS supporting two types of communication systems.

2. Description of the Related Art

In general, when a normal Base Station (BS) operating multiple Frequency Assignments (FAs) is located adjacent to a compact BS operating a smaller number of FAs than the normal BS, calls may frequently drop, due to different FAs between the two BSs. To provide seamless call without dropping calls, the compact BS transmits a beacon signal, i.e., the same virtual radio frequency as an FA used in the normal BS, so as to induce a handover of a Mobile Station (MS).

FIG. 1 illustrates an operation of generating a beacon in a compact Base Station (BS) for a Frequency Assignment (FA) of a normal BS. For example, as shown in FIG. 1, when a normal BS 100 supports beacons F1 to F5 and a compact BS 110 supports only one beacon F1, the compact BS transmits the beacons F2 to F5 in turn, so as to induce a handover of an MS receiving a service from the BS 100. In this case, when the compact BS transmits multiple beacons in turn as described above, these beacons are called hopping pilot beacons.

FIG. 2 is a timing diagram illustrating a conventional hopping pilot beacon, Referring to FIG. 2, three parameters are defined for a hopping pilot beacon 207 according to the Interim Standard (IS)-2000, and the parameters are a NGHBR_TX_PERIOD 201 for indicating a period of a pilot beacon transmission window, a NGHBR_TX_DURATION 203 for indicating a pilot beacon transmission duration, and a MGHBR_TX_OFFSET 205 for determining a transmission start position of a pilot beacon based on a first transmission window. The three parameters allow an MS to recognize the hopping pilot beacon through use of a General Neighbor List Message (GNLM) of a neighbor BS.

The conventional compact BS uses a signal copy method to transmit the pilot beacon. FIG. 3 is block diagram of an apparatus for generating a beacon by using a signal copy method in a conventional compact BS and FIG. 4 illustrates a beacon output according to a control signal of a hopping pilot beacon in a conventional signal copy method. Referring to FIG. 3, the BS using the signal copy method consists of a main system 300 for supporting a main FA within the BS and a beacon subsystem 310 for generating and transmitting a beacon. Thus, the beacon subsystem 310 copies a transmission signal currently being operated by a main FA in an Intermediate Frequency (IF) stage or a Radio Frequency (RF) stage, and shifts its frequency into a desired frequency. Thereafter, as illustrated in FIG. 4, the beacon subsystem 310 transmits a frequency-shifted signal by controlling output timing of the frequency-shifted signal.

Voice-based CDMA2000 1x and data-based CDMA EVolution Data Optimized (EV-DO) coexist in current Code Division Multiple Access (CDMA) mobile communication systems. To support this coexistence, a CDMA2000 1x BS and a CDMA EV-DO BS are installed together, or a BS supporting both CDMA2000 1x and CDMA EV-DO is newly installed. Since use of compact BSs has become a trend, pico/femto BSs supporting both CDMA2000 1x and CDMA EV-DO are being newly installed. FIG. 5 illustrates an operation of generating beacons for FAs of two types of systems in a conventional BS supporting both a CDMA2000 1x system and a CDMA EV-DO system. As illustrated in FIG. 5, for a case where an MS receiving a service from a macro BS supporting multi-channel CDMA2000 1x and CDMA EV-DO performs a handover to a pico/femto BS, the pico/femto BS must generate a hopping pilot beacon for both CDMA2000 1x and CDMA EV-DO.

FIG. 6 is a block diagram illustrating an apparatus for generating beacons for FAs of two types of systems in a conventional BS supporting both a CDMA2000 1x system and a CDMA EV-DO system. As illustrated in FIG. 6, to generate the hopping pilot beacon, the BS supporting CDMA2000 1x and CDMA EV-DO must include subsystems 601 and 603 for CDMA2000 1x and CDMA EV-DO systems, respectively. However, since a power amplifier module and a transmitter included in each subsystem are expensive components, employing each of the subsystems is not cost effective.

SUMMARY OF THE INVENTION

The present invention has been made to address at least the above problems and/or disadvantages and to provide at least the advantages described below. Accordingly, one aspect of the present invention provides an apparatus for generating a pilot beacon of a Base Station (BS) in a mobile communication system.

Another aspect of the present invention is to provide an apparatus for generating a pilot beacon to allow a Mobile Station (MS) to perform a handover in a BS supporting two types of communication system.

Another aspect of the present invention is to provide an apparatus for generating a pilot beacon by using a minimum number of hardware components in a BS supporting two types of communication systems.

Another aspect of the present invention is to provide an apparatus for alternately generating pilot beacons for two types of communication systems by using one subsystem in a BS supporting two types of communication systems.

According to an aspect of the present invention, an apparatus for generating a pilot beacon of a BS supporting a dual communication system is provided. The apparatus includes a first system unit for converting a first signal for a first communication system into a first high-frequency signal, a second system unit for converting a second signal for a second communication system into a second high-frequency signal, and a beacon system unit for alternately generating beacon signals for the first and second communication systems by using the first and second signals.

According to another aspect of the present invention, a method for generating a pilot beacon of a Base Station (BS) supporting a first communication system and a second communication system is provided. The method includes converting a first signal for a first communication system into a first high-frequency signal; converting a second signal for a second communication system into a second high-frequency signal; and alternately generating a first beacon signal and a second beacon signal for the first and second communication systems, respectively, by using the first and second signals.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EMBODIMENTS OF THE PRESENT INVENTION

Figure 1:
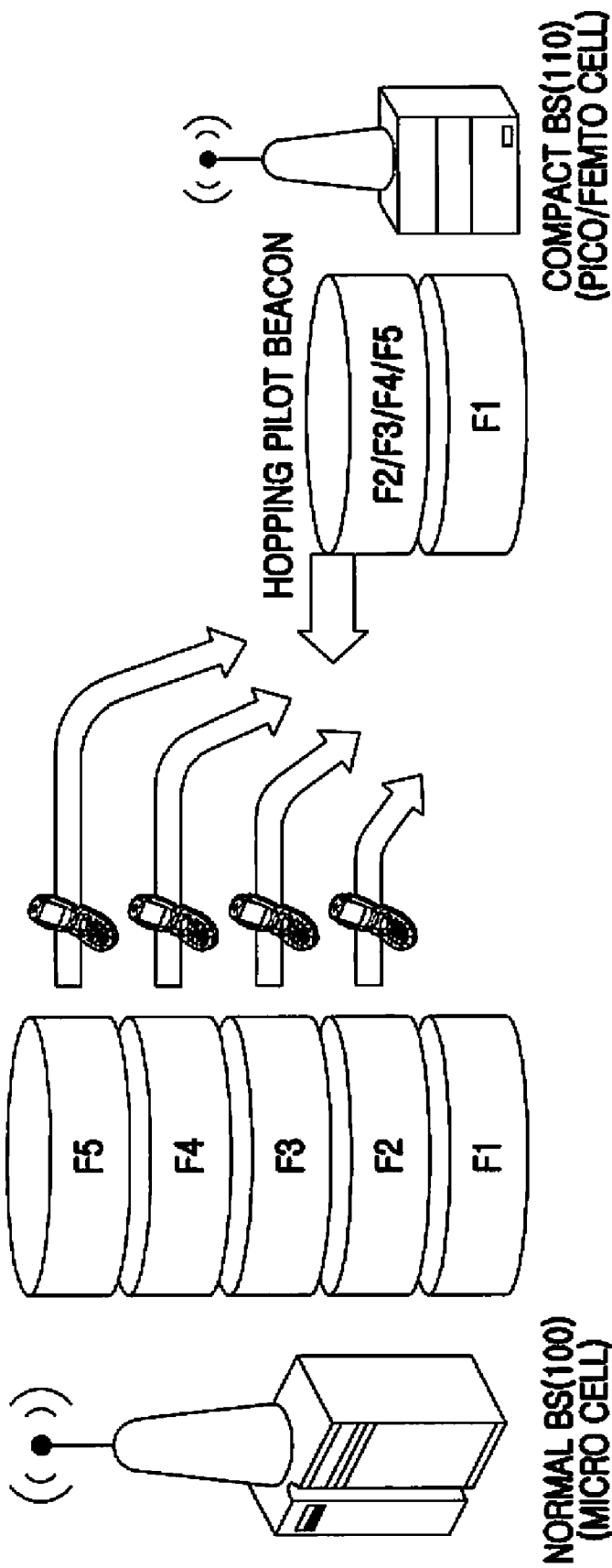
FIG. 1 is a diagram illustrating an operation of generating a beacon in a compact Base Station (BS) for a Frequency Assignment (FA) of a normal BS.
Figure 2:
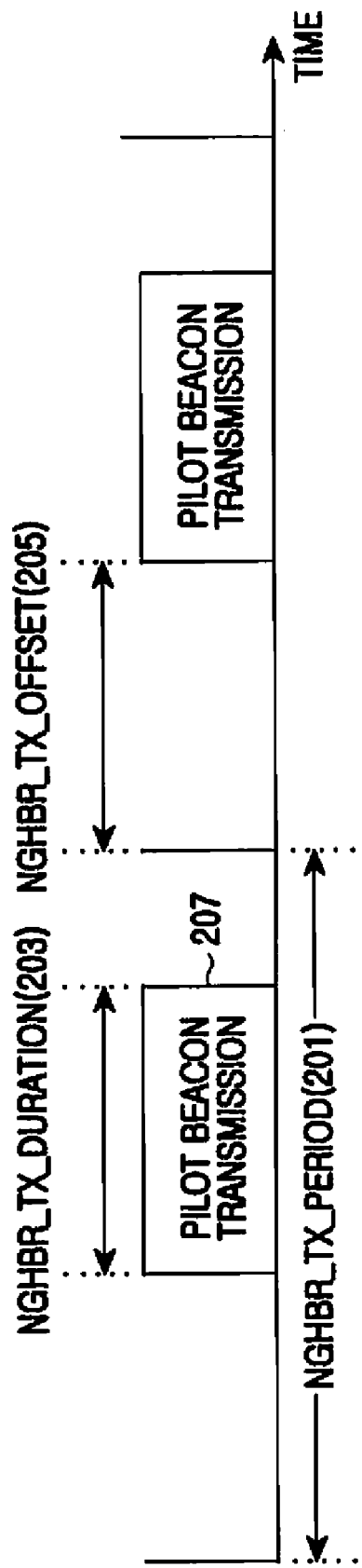
FIG. 2 is a timing diagram illustrating a conventional hopping pilot beacon.
Figure 3:
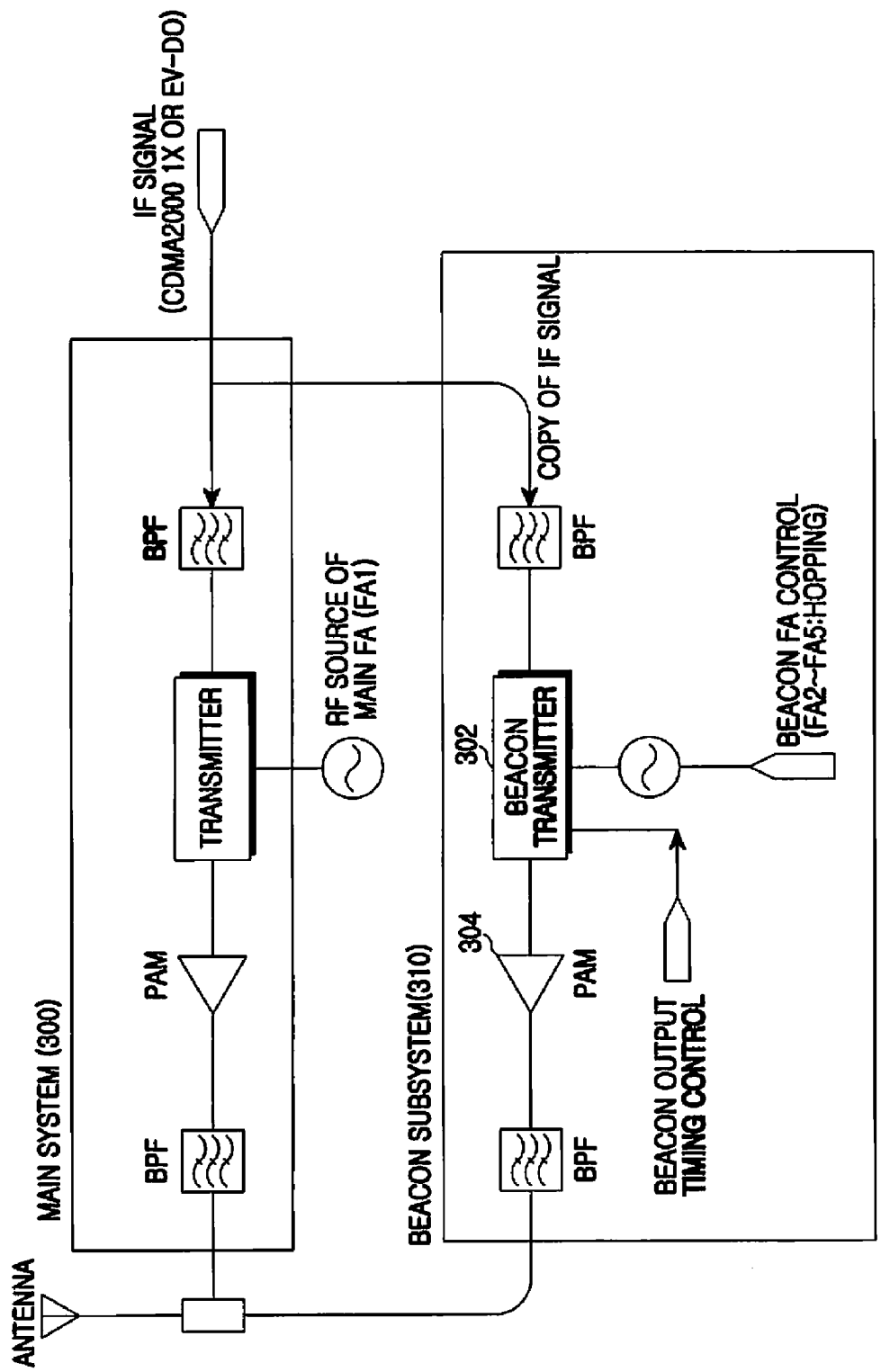
FIG. 3 is block diagram of an apparatus for generating a beacon by using a signal copy method in a conventional compact BS.
Figure 4:
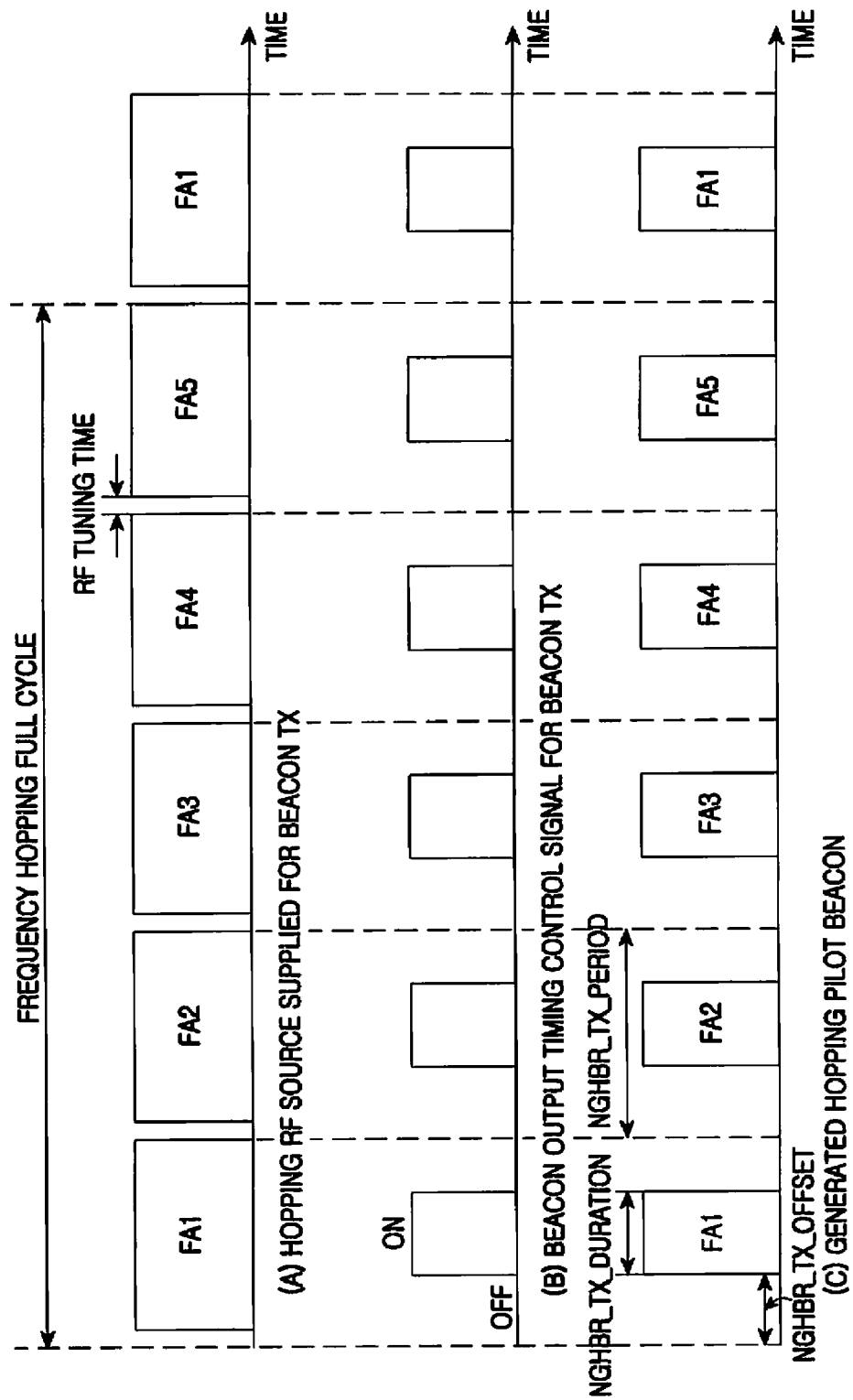
FIG. 4 is a diagram illustrating a beacon output according to a control signal of a hopping pilot beacon in a conventional signal copy method.
Figure 5:
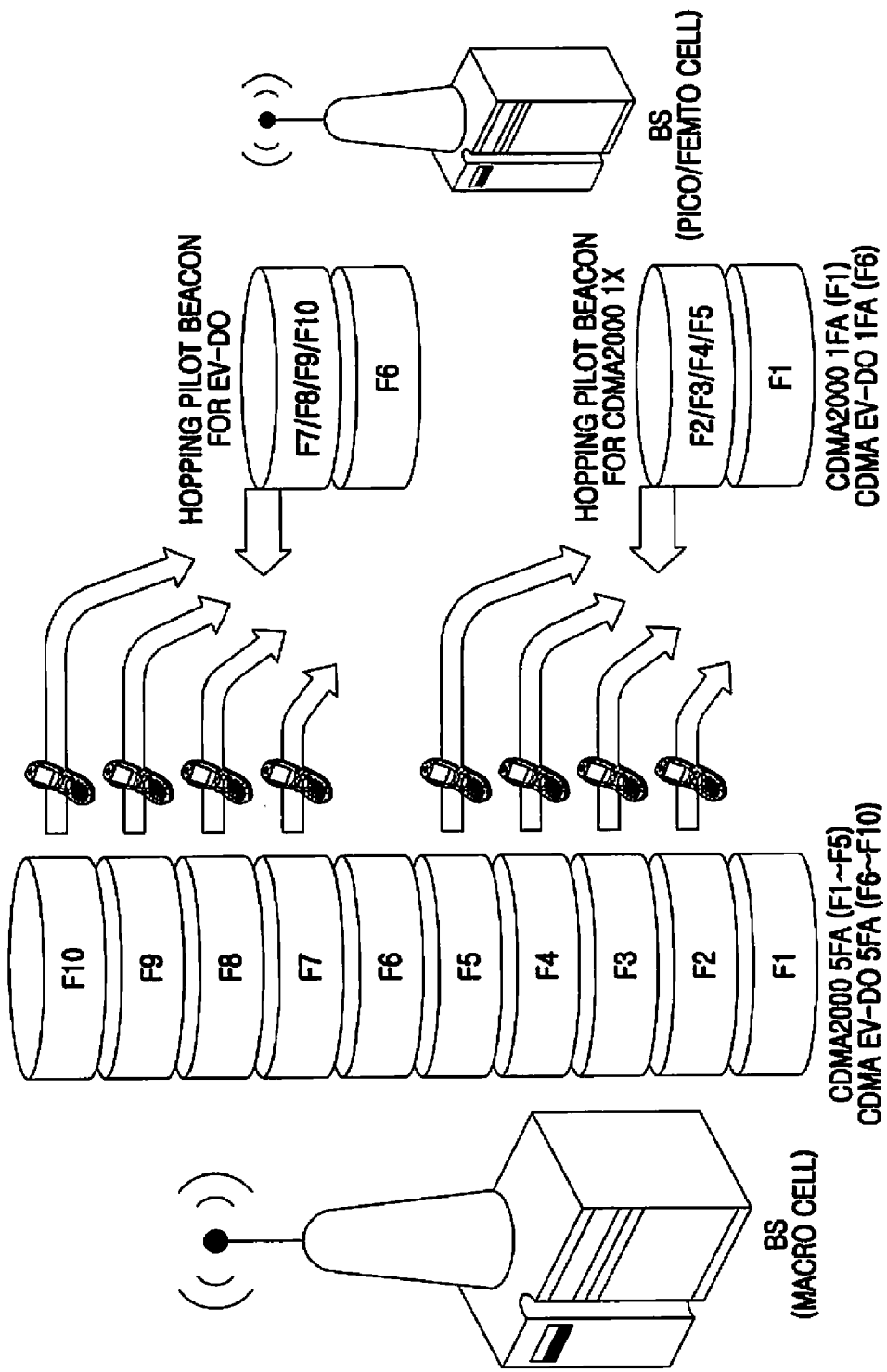
FIG. 5 is a diagram illustrating an operation of generating beacons for FAs of two types of systems in a conventional BS supporting both a Code Division Multiple Access (CDMA) 2000 1x system and a CDMA EVolution Data Optimized (EV-DO) system.
Figure 6:
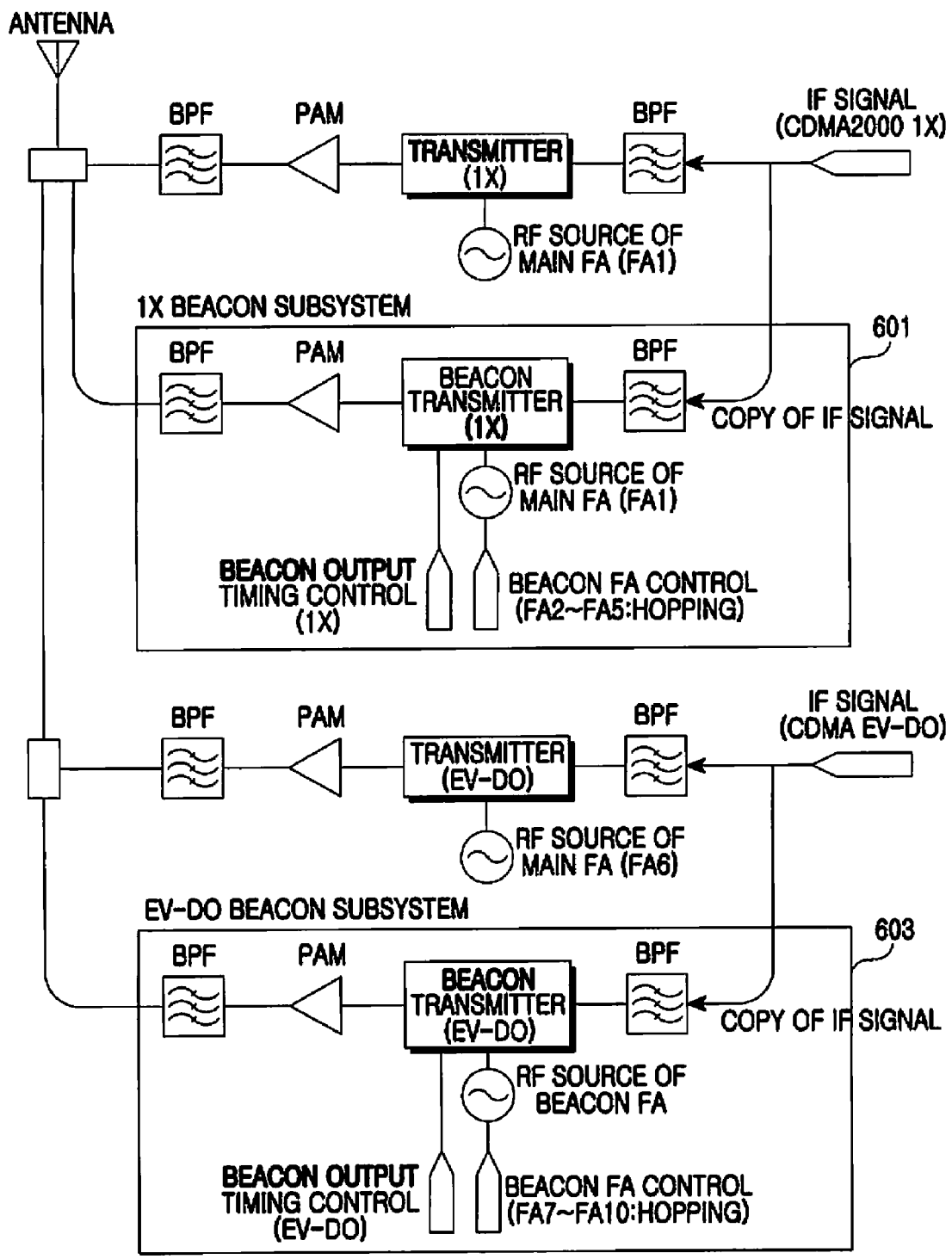
FIG. 6 is a block diagram illustrating an apparatus for generating beacons for FAs of two types of systems in a conventional BS supporting both a CDMA2000 1x system and a CDMA EV-DO system.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The present invention relates to an apparatus for alternately generating beacons for Frequency Assignments (FAs) of two types of communication systems by using a subsystem including one high-power amplifier and one transmitter in a Base Station (BS) supporting the two types of communication systems. Hereinafter, a BS supporting both a Code Division Multiple Access (CDMA) 2000 1x system and a CDMA EVolution Data Optimized (EV-DO) system will be described as an example. However, the present invention can also apply to a BS supporting other types of systems.

Figure 7:
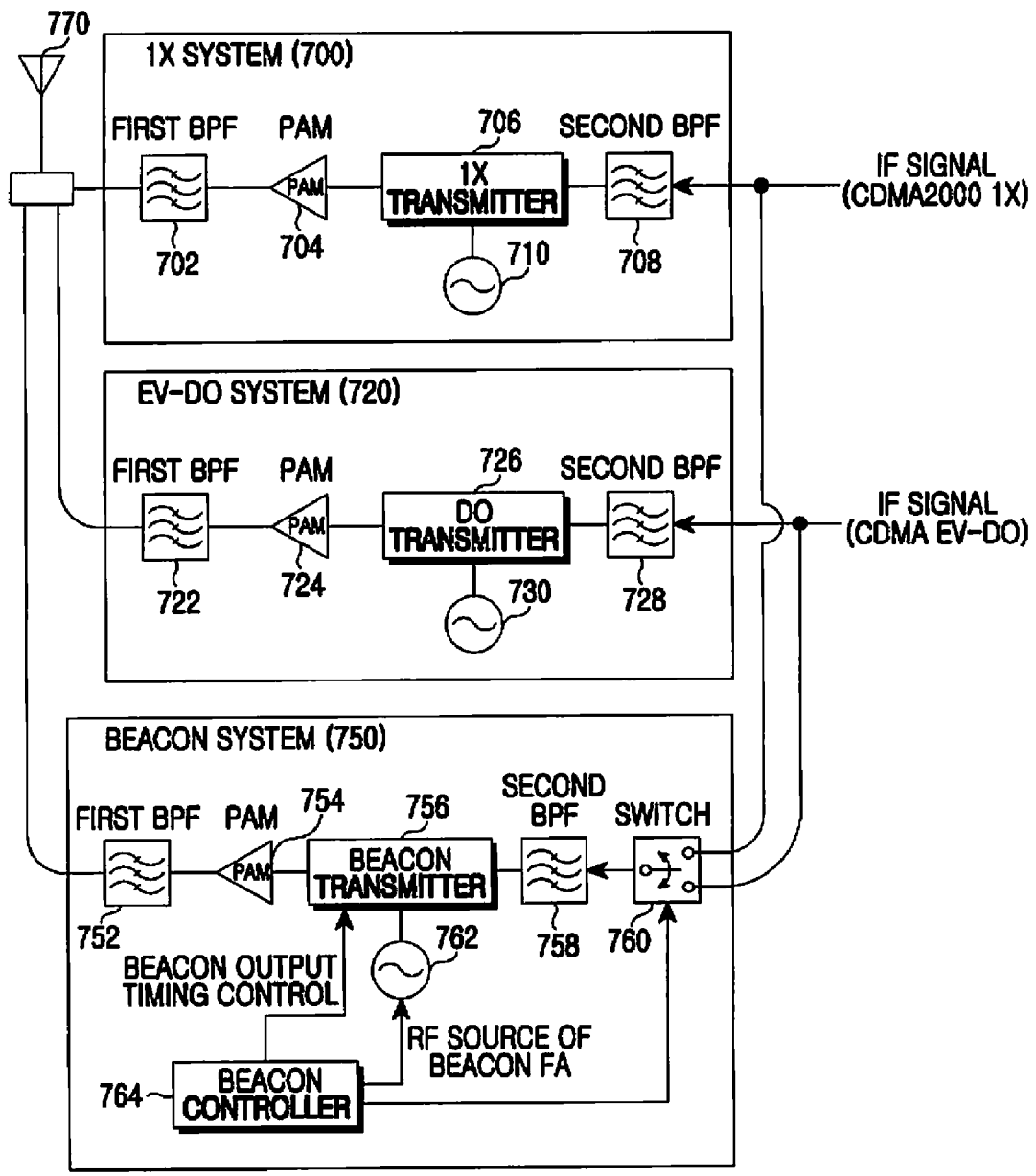
FIG. 7 is a block diagram illustrating an apparatus for generating beacons for FAs of two types of systems in a BS supporting both a CDMA2000 1x system and a CDMA EV-DO system according to an embodiment of the present invention.

FIG. 7 is a block diagram illustrating an apparatus for generating beacons for FAs of two types of systems in a BS supporting both a CDMA2000 1x system and a CDMA EV-DO system according to an exemplary embodiment of the present invention.

Referring to FIG. 7, the BS includes a 1x system 700 for CDMA2000 1x (hereinafter, "1x") and an EV-DO system 720 for CDMA EV-DO (hereinafter, "EV-DO"). The BS also includes one beacon system 750 for generating beacons with respect to FAs for 1x and EV-DO.

The 1x system 700 and the EV-DO system 720, respectively, include first Band Pass Filters (BPFs) 702 and 722, Power Amplifier Modules (PAMs) 704 and 724, 1x/DO transmitters 706 and 726, Voltage Controller Oscillators (VCOs) 710 and 730, and second BPFs 708 and 728.

In the two systems 700 and 720, the second BPFs 708 and 728 receive Intermediate Frequency (IF) signals from corresponding systems, pass only specific band signals, and provide the band-passed signals to the 1x/DO transmitters 706 and 726. Further, the VCOs 710 and 730 modify reference frequency sources by regulating voltage and provide the modified reference frequency sources to the 1x/DO transmitters 706 and 726, i.e., the VCOs 710 and 730 modify the reference frequency sources by changing voltage according to frequency bands to be supported.

Then, the 1x/DO transmitters 706 and 726 use the reference frequency sources provided from the VCOs to up-convert the IF signals provided from the second BPFs 708 and 728 into high-frequency signals. Then, the 1x/DO transmitters 706 and 726 provide the high-frequency signals to the PAMs 704 and 734. The PAMs 704 and 734 amplify the signals transmitted from the 1x/DO transmitters 706 and 726 into high-power signals and provide the high-power signals to the first BPFs 702 and 722. The first BPFs 702 and 722 pass only specific-band signals and then provide the band-passed signals to an antenna 770.

The beacon system 750 includes a first BPF 752, a PAM 754, a beacon transmitter 756, a VCO 762, a second BPF 758, a switch 760, and a beacon controller 764. With this structure, the beacon system 750 generates hopping pilot beacons for FAs of the 1x system and the EV-DO system.

In the beacon system 750, the beacon controller 764 controls a frequency of a pilot beacon to be generated by using pre-stored frequency information regarding a neighbor BS, and controls output timing of the generated pilot beacon. More specifically, the beacon controller 764 controls switching performed by the switch 760 so that both 1x and EV-DO pilot beacons are transmitted within one pilot beacon transmission period. Further, by using the pre-stored frequency information regarding the neighbor BS, i.e, by using information regarding a frequency of a 1x system and a frequency of an EV-DO system, wherein the frequencies are supported by the neighbor BS, the beacon controller 764 controls the VCO 762 to alternately oscillate the reference frequencies of the two systems.

In addition, the beacon controller 764 controls a switching operation of the switch 760 and an output operation of the beacon transmitter 756 to equalize pilot beacon transmission periods of the two systems. Further, the beacon controller 764 provides control such that pilot beacon signals for the two systems do not overlap in a time domain by maintaining a sufficient time interval. More specifically, the beacon controller 764 performs a control operation to satisfy the following Equations (1) to (3).

$$\text{CHPB\_TX\_PERIOD} = \text{NGHBR\_TX\_PERIOD\_1} = \text{NGHBR\_TX\_PERIOD\_2} \quad (1)$$

Figure 8:
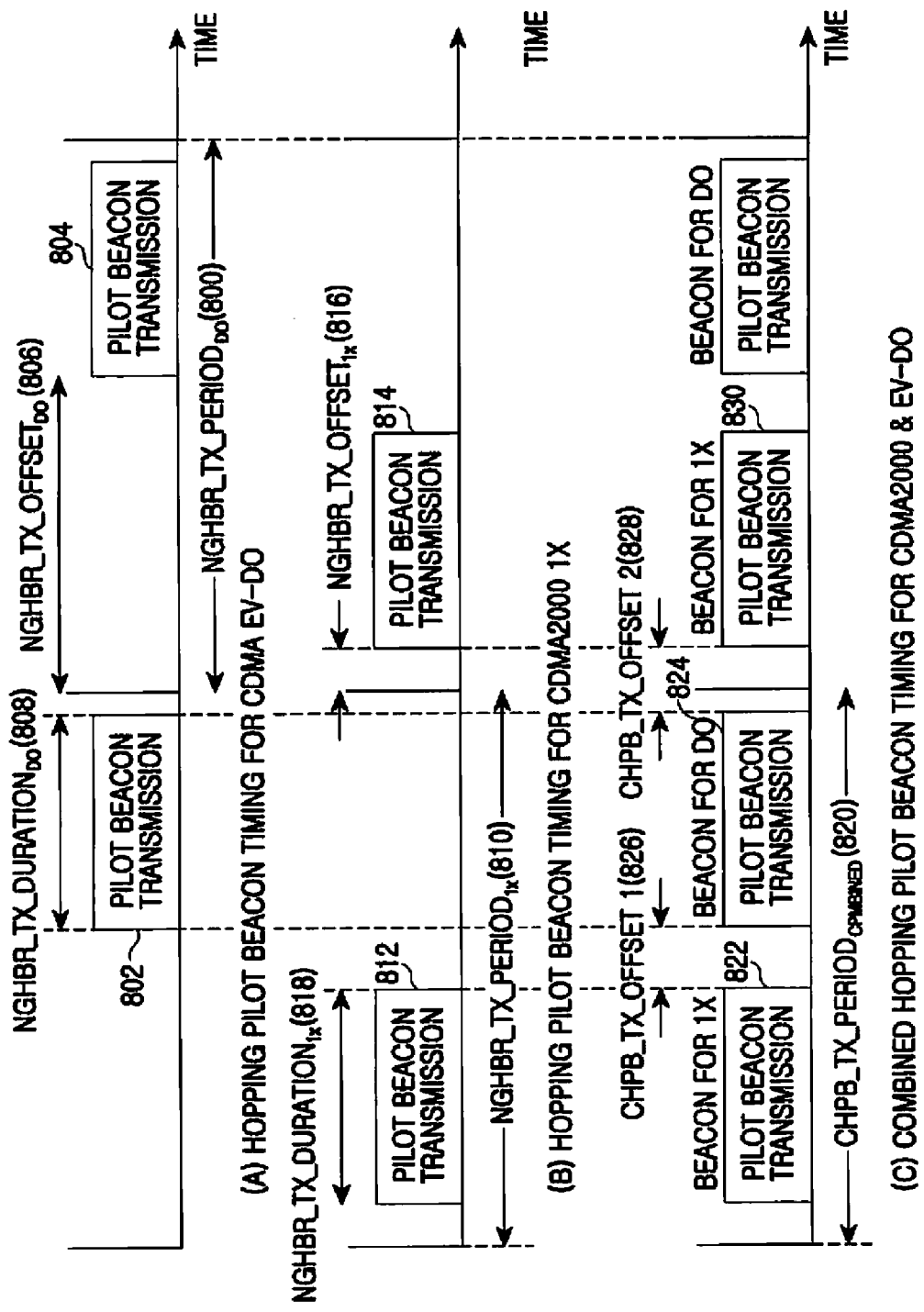
FIG. 8 is a timing diagram illustrating a hopping pilot beacon according to an embodiment of the present invention.

In Equation (1), referring to FIG. 8, the CHPB_TX_PERIOD denotes a CHPB_TX_PERIOD$_{Combined}$ 820 that is a transmission period obtained by combining EV-DO and 1x. The NGHBR_TX_PERIOD_1 and the NGHBR_TX_PERIOD_2 respectively denote a $NGHBR\_TX\_PERIOD_{DO}$ 800 and a $NGHBR\_TX\_PERIOD_{1x}$ 810, which are pilot beacon transmission periods for 1x and EV-DO, respectively.

$$CHPB\_TX\_OFFSET1=NGHBR\_TX\_OFFSET\_2-\\(NGHBR\_TX\_OFFSET\_1+NGHBR\_TX\_DU-\\RATION\_1)>0 \quad (2)$$

In Equation (2), referring to FIG. 8, the CHPB_TX_OFFSET1 denotes a CHPB_TX_OFFSET1 826 that is a time interval from a time point where a first pilot beacon 822 is transmitted to a time point where a second pilot beacon 824 is transmitted in a single pilot beacon transmission period 820 for 1x and EV-DO. The NGHBR_TX_OFFSET_1 and the NGHBR_TX_OFFSET_2 respectively denote a $NGHBR\_TX\_OFFSET_{DO}$ 806 and a $NGHBR\_TX\_OFFSET_{1x}$ 816. The $NGHBR\_TX\_OFFSET_{DO}$ 806 and the $NGHBR\_TX\_OFFSET_{1x}$ 816 are time intervals from a time point where single pilot beacon transmission periods 800 and 810 for 1x or EV-DO start to a time point where first pilot beacons 804 and 814 are transmitted, within the transmission period. The NGHBR_TX_DURATION_1 denotes a $NGHBR\_TX\_DURATION_{DO}$ 808 that is a transmission time of a pilot beacon for EV-DO.

$$CHPB\_TX\_OFFSET2=NGHBR\_TX\_PERIOD\_2-\\(NGHBR\_TX\_OFFSET\_2+NGHBR\_TX\_DU-\\RATION\_2)+NGHBR\_TX\_OFFSET\_1>0 \quad (3)$$

In Equation (3), referring to FIG. 8, the CHPB_TX_OFFSET2 denotes a CHPB_TX_OFFSET2 828 that is a time interval from a time point where the second pilot beacon 824 is transmitted to a time point where a first pilot beacon 830 is transmitted in the single pilot beacon transmission period 820 for 1x and EV-DO. The NGHBR_TX_DURATION_2 denotes a $NGHBR\_TX\_DURATION_{1x}$ 818, which is a transmission time of a pilot beacon for 1x.

To facilitate system design, the beacon controller 764 controls a switching operation of the switch 760 and an output operation of the beacon transmitter 756. As a result, as expressed by Equation (4) and Equation (5) below, the two systems have the same pilot beacon transmission time, and the respective pilot beacons have the same transmission time interval.

$$NGHBR\_TX\_DURATION\_1=NGHBR\_TX\_DURA-\\TION\_2 \quad (4)$$

$$CHPB\_TX\_OFFSET1=CHPB\_TX\_OFFSET2 \quad (5)$$

As shown in FIG. 8, the beacon controller 764 controls timing such that the NGHBR_TX_DURATION_1 and the NGHBR_TX_DURATION_2 respectively coincide with the $NGHBR\_TX\_DURATION_{1x}$ 818 and the $NGHBR\_TX\_DURATION_{DO}$ 808, which are respectively transmission times of their pilot beacons for 1x and EV-DO. Further, the beacon controller 764 controls timing such that the CHPB_TX_OFFSET1 826 and the CHPB_TX_OFFSET2 828 respectively coincide with time intervals of their pilot beacons.

Consequently, the beacon controller 764 performs a control operation to satisfy Equation (6) below.

$$NGHBR\_TX\_PERIOD\_2=2\times NGHBR\_TX\_OFF-\\SET\_1-NGHBR\_TX\_OFFSET\_2 \quad (6)$$

In Equation (6), referring to FIG. 8, the NGHBR_TX_PERIOD_2 denotes the $NGHBR\_TX\_PERIOD_{1x}$ 810, which is a pilot beacon transmission period for 1x. The NGHBR_TX_OFFSET_1 and the NGHBR_TX_OFFSET_2 respectively denote the $NGHBR\_TX\_OFFSET_{DO}$ 806 and the $NGHBR\_TX\_OFFSET_{1x}$ 816.

Figure 9:
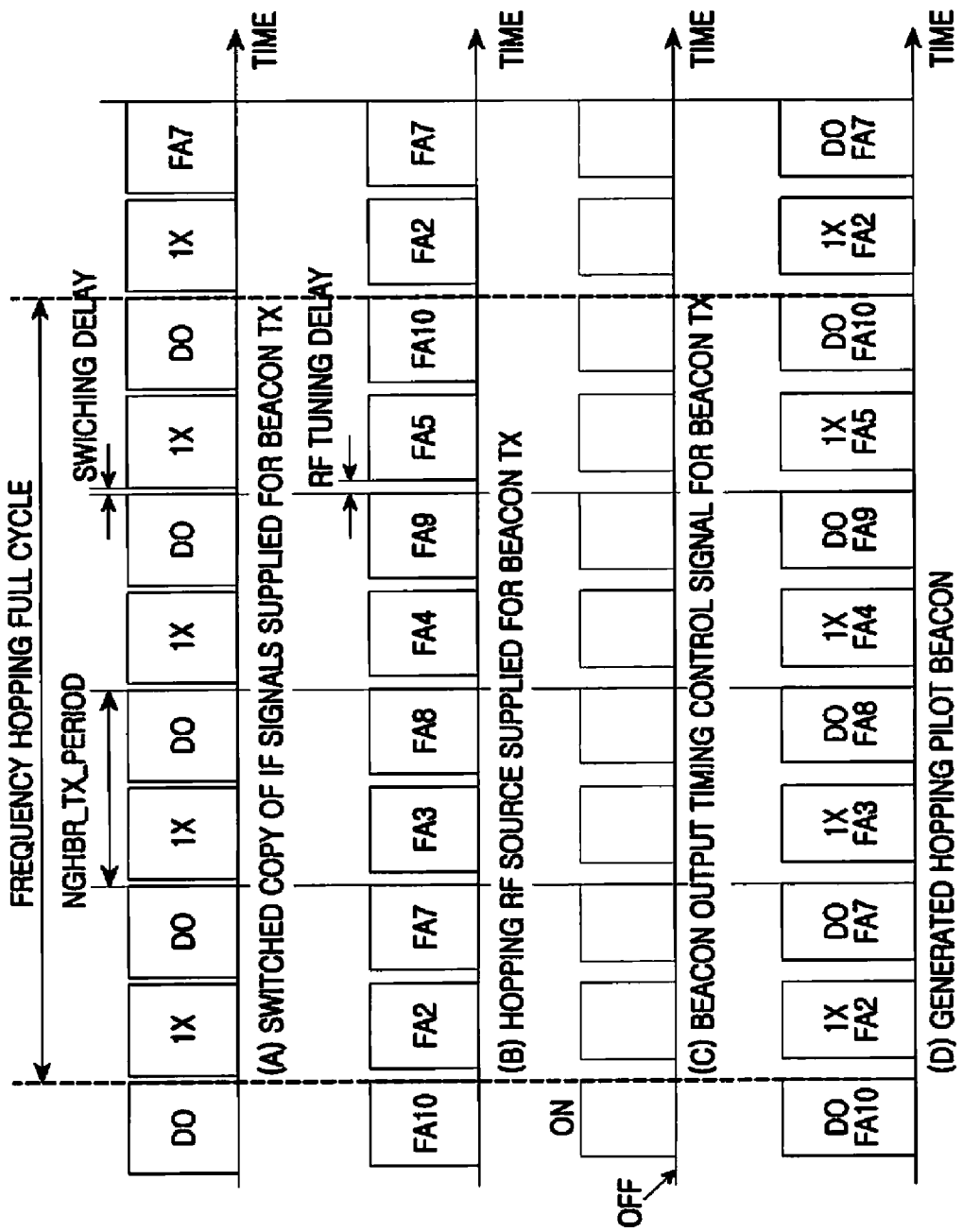
FIG. 9 illustrates an operation of generating beacons for FAs of two types of systems according to an embodiment of the present invention.

The switch 760 performs a switching operation under the control of the beacon controller 764 such that an IF signal of the 1x system is delivered to the second BPF 758 or an IF signal of the EV-DO system is delivered to the second BPF 758. For example, the switch 760 performs a switching operation under the control of the beacon controller 764 such that, as shown in FIG. 9, a beacon for the 1x system and a beacon for the EV-DO system are alternately transmitted to the second BPF 758. The switch 760 performs the switching operation with a period of "0.5×CHPB_TX_PERIOD" to satisfy Equations (4) to (6) above under the control of the beacon controller 764.

The second BPF 758 receives an IF signal that is currently operated in either 1x or EV-DO through the switch 760, passes only a specific-band signal, and provides the band-passed signal to the beacon transmitter 756.

The beacon controller 764 controls the VCO 762 to modify the reference frequency source by changing voltage according to a frequency band to be supported, and provide the modified reference frequency source to the beacon transmitter 756. The VCO 762 alternately oscillates a reference frequency for the 1x system and a reference frequency for the EV-DO system under the control of the beacon controller 764. For example, as shown in FIG. 9, if the BS supports only frequency bands of F1 and F6, in a case where the 1x system uses frequency bands of F1 to F5 and the EV-DO system uses frequency bands of F1 to F10, the VCO 762 alternately oscillates frequencies of the 1x system and the EV-DO system in the order of F2, F7, F3, F8, F4, F9, F5, and F10, under the control of the beacon controller 764.

The VCO 762 alternately oscillates the frequencies with a period of "0.5×CHPB_TX_PERIOD" to satisfy Equations (4) and (5) above, under the control of the beacon controller 764.

Then, by using the reference frequency sources provided from the VCO 762, the beacon transmitter 756 up-converts an IF signal provided from the second BPF 758 into a high-frequency signal, and then provides the high-frequency signal to the PAM 754. The beacon controller 764 controls the output timing of a beacon output from the beacon transmitter 756. For example, as shown in FIG. 9, the beacon transmitter 756 receives, from the beacon controller 764, a timing control signal and outputs the beacon only when the signal is in an 'on' state. Thus, the beacon transmitter 756 outputs a hopping pilot beacon signal. The timing control signal is turned on/off to satisfy the CHPB_TX_OFFSET1 and the CHPB_TX_OFFSET2 of Equation (2) and Equation (3) above.

The PAM 754 amplifies a signal transmitted from the beacon transmitter 756 into a high-power signal and then provides the high-power signal to the first BPF 752. The PAM 754 passes only a specific-band signal and then provides the band-passed signal to the antenna 770.

Although, according the above-described examples, a hopping pilot beacon may be generated to support both CDMA2000 1x and CDMA EV-DO systems, the hopping plot beacon may be generated to support any one of the two systems by changing a control method.

According to the present invention, a BS supporting two types of communication systems alternately generates beacons for FAs of the two systems by using a subsystem including one high-power amplifier and one transmitter. Therefore, costs for hardware implementation can be reduced.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An apparatus for generating a pilot beacon of a Base Station (BS) supporting a dual communication system, the apparatus comprising:
    a first system unit for converting a first signal for a first communication system into a first high-frequency signal;
    a second system unit for converting a second signal for a second communication system into a second high-frequency signal; and
    a beacon system unit for receiving one of the first signal and second signal by performing a switching operation and alternately generating beacon signals for the first and second communication systems by using the received signals.

2. The apparatus of claim 1, wherein the beacon system unit comprises:
    a beacon controller for performing a control operation to alternately generate the beacon signals;
    a switch for performing the switching operation under a control of the beacon controller to alternately deliver the first and second signals;
    a Voltage Controlled Oscillator (VCO) for alternately oscillating reference frequencies for the first and second communication systems under the control of the beacon controller; and
    a transmitter for converting signals delivered from the switch by using the reference frequencies oscillated by the VCO so as to alternately generate the beacon signals.

3. The apparatus of claim 2, wherein the beacon controller controls the switch such that the first and second signals are alternately transmitted to the transmitter during one beacon transmission period, and controls output timing of a beacon generated by the transmitter.

4. The apparatus of claim 2, wherein the beacon controller provides control such that the first and second communication systems have a same beacon transmission period and such that the first and second beacon signals do not overlap in transmission by maintaining a specific time interval.

5. The apparatus of claim 2, wherein the beacon controller provides control such that the first and second communication systems have a same beacon transmission time and such that the first and second beacon signals have a same transmission time interval.

6. The apparatus of claim 1, wherein the beacon system unit comprises:
    one transmitter for alternately generating the first and second beacon signals for the first and second communication systems; and
    one power amplifier for amplifying the generated beacon signals.

7. A method for generating a pilot beacon of a Base Station (BS) supporting a first communication system and a second communication system, the method comprising:
    converting a first signal for a first communication system into a first high-frequency signal;
    converting a second signal for a second communication system into a second high-frequency signal; and
    receiving, by a beacon system unit, one of the first signal and second signal by performing a switching operation;
    alternately generating, by the beacon system unit, a first beacon signal and a second beacon signal for the first and second communication systems, respectively, by using the received signals.

8. The method of claim 7, wherein alternately generating the first beacon signal and the second beacon signal comprises:
    alternately oscillating reference frequencies for the first and second communication systems; and
    converting the received signals by using the reference frequencies oscillated so as to alternately generate the beacon signals.

9. The method of claim 8, wherein the first and second signals are alternately transmitted to a transmitter during one beacon transmission period.

10. The method of claim 8, wherein the first and second communication systems have a same beacon transmission period and the first and second beacon signals do not overlap in transmission by maintaining a specific time interval.

11. The method of claim 8, wherein the first and second communication systems have a same beacon transmission time and such that the first and second beacon signals have a same transmission time interval.

12. The method of claim 7, further comprising amplifying the generated beacon signals.

* * * * *